US 6,260,691 B1

(12) United States Patent
Buchas

(10) Patent No.: US 6,260,691 B1
(45) Date of Patent: Jul. 17, 2001

(54) VIBRATORY SYSTEM

(75) Inventor: Gerald L. Buchas, Bristol, CT (US)

(73) Assignee: Arthur G. Russell Company, Inc., Bristol, CT (US)

( * ) Notice: Subject to any disclaimer, the term of this patent is extended or adjusted under 35 U.S.C. 154(b) by 0 days.

(21) Appl. No.: 09/366,580

(22) Filed: Aug. 4, 1999

(30) Foreign Application Priority Data

Nov. 2, 1998 (GB) .................................................. 9823900

(51) Int. Cl.⁷ ................................................ B65G 27/28
(52) U.S. Cl. ........................ 198/760; 198/751; 198/769
(58) Field of Search ..................................... 198/751, 769

(56) References Cited

U.S. PATENT DOCUMENTS

| | | | | |
|---|---|---|---|---|
| 4,168,774 | * | 9/1979 | Musschoot | 198/751 |
| 4,369,398 | * | 1/1983 | Lowry, Sr. | 318/114 |
| 4,490,654 | | 12/1984 | Buchas . | |
| 4,811,835 | * | 3/1989 | Bullivant | 198/762 |
| 5,074,403 | * | 12/1991 | Myhre | 198/751 |
| 5,080,218 | * | 1/1992 | Izume et al. | 198/751 |
| 5,145,054 | * | 9/1992 | Nelson | 198/751 |
| 5,158,170 | * | 10/1992 | Grengg et al. | 198/751 |
| 5,777,232 | * | 7/1998 | Kurita et al. | 73/664 |
| 5,883,478 | | 3/1999 | Thesling | 318/119 |
| 5,920,144 | * | 7/1999 | Atsuta | 318/116 X |
| 5,931,285 | * | 8/1999 | Madsen et al. | 198/762 |
| 5,967,293 | * | 10/1999 | Gaines | 198/464.2 |
| 6,029,796 | * | 2/2000 | Musschoot | 198/753 |

* cited by examiner

Primary Examiner—Robert P. Olszewski
Assistant Examiner—Richard Ridley
(74) Attorney, Agent, or Firm—McCormick, Paulding & Huber LLP

(57) ABSTRACT

A vibratory system for a vibration feeder includes pulse means for generating electrical digital pulse signals. A controller controllably converts the electrical digital pulse signals either into an incrementally increasing or decreasing DC voltage level. At least one vibration block is coupled to the controller for being increased or decreased in its amplitude of vibration in response to the respective incrementally increasing or decreasing DC voltage level generated by the controller. A remotely located additional controller, such as a programmable logic controller, may be coupled to the controller for transmitting electrical digital pulse signals to control the amplitude of vibration.

13 Claims, 4 Drawing Sheets

VIBRATORY SYSTEM

FIELD OF THE INVENTION

The present invention relates generally to a vibratory system, and more particularly to a vibratory system for a vibratory parts feeder.

BACKGROUND OF THE INVENTION

Vibration systems are conventionally used in manufacturing to correctly orient and deliver small items such as plastic covers to assembly lines. Such systems typically include a vibratory bowl, the vibration of which is controlled by a controller.

Conventional systems have a number of associated problems. Firstly, the controllers of the system are typically on/off switches which do not allow for the system to be fine-tuned for specific applications. Secondly, adjustment of the vibration parameters is achieved by manual adjustment of the vibratory blocks. These blocks are typically located underneath the vibratory bowl or the like and are often difficult to access.

Accordingly, it is an object of the present invention to provide a vibratory system which overcomes the above-mentioned drawbacks and disadvantages.

SUMMARY OF THE INVENTION

According to a first aspect of the present invention, a vibratory system for a vibration feeder includes pulse means for generating electrical digital pulse signals. A controller controllably converts the electrical digital pulse signals either into an incrementally increasing or decreasing DC voltage level. At least one vibration block is coupled to the controller for being increased or decreased in its amplitude of vibration in response to the respective incrementally increasing or decreasing DC voltage level generated by the controller.

More specifically, the controller includes an adjustment function for varying the vibration parameters of the vibration system, and may include a save function to save the vibration parameters.

As mentioned above, the adjustment function typically allows the amplitude of the vibration of the system to be controlled. This allows a user to accurately set and control the vibration system.

Typically, the adjustment of the amplitude is incremental. The increments are preferably small values. This allows the vibration system to be finely tuned for a specific application.

The adjustment function typically includes an increment button, an up/down button and a save button.

Preferably, the adjustment function includes a feedback system. This allows for automatic adjustment of the vibration parameters to maintain a constant output. The feedback system typically comprises a transducer, the transducer being coupled to the vibration system to measure the amplitude and/or frequency of vibration. The transducer is preferably a solid state transducer. This reduces the possibility of failure as there are no moving parts, thus increasing the lifecycle and reliability of the controller.

The save function typically allows a user to save the latest parameters of the vibration system. Thus, when the system is powered down (i.e., switched off) the latest parameters are stored for subsequent retrieval when the system is powered up (i.e., switched on).

Optionally, the controller includes a display for displaying the vibration parameters. Preferably, the display is a digital display. This allows for more accurate readings and aids the user in setting up the vibration system.

Optionally, the controller further includes indicia for indicating the status of the controller. The indicia typically comprises light emitting diodes (LEDs). Typically, a green LED indicates that the system is running, and a red LED indicates a fault in the system.

Optionally, a remote controller may be coupled to the control to remotely control the functions of the controller. The remote controller is typically provided with an increment button, an up/down button and a save button. The remote controller optionally includes a display for displaying the vibration parameters. The remote controller optionally includes indicia for indicating the current status of the controller.

According to a second aspect of the present invention there is provided a vibratory block comprising a pair of end plates, at least one pair of springs attached to opposite edges of said end plates, and vibration means, characterized in that the springs comprise composite springs.

The composite springs are preferably flat, leaf springs. The composite springs typically comprise a plurality of glass filaments. Preferably, 85–90% of the filaments are oriented in the bending or primary direction, and 10%–15% of the filaments are oriented perpendicularly to the primary direction.

The vibration means typically comprises an electromagnet.

Embodiments of the present invention shall now be described with reference to the accompanying drawings.

DETAILED DESCRIPTION OF THE PREFERRED EMBODIMENTS

Figure 1:
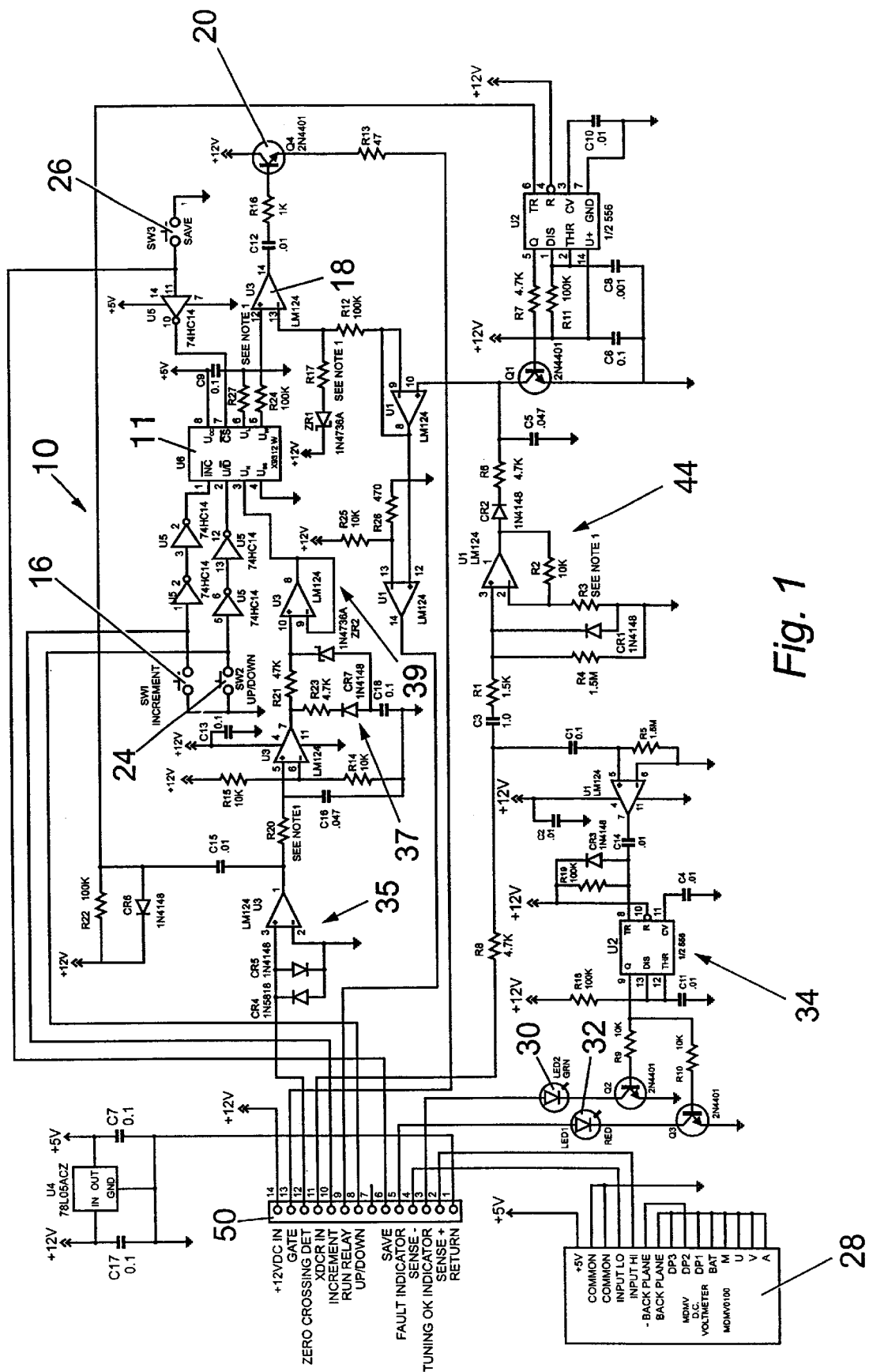
FIG. 1 is a schematic circuit diagram of a logic board for use with the controller embodying the present invention.

FIG. 1 shows a schematic circuit diagram of a logic board which forms part of a controller 10 embodying the present invention. The controller 10 powers and controls the vibration of a vibratory parts feeder.

Figure 2:
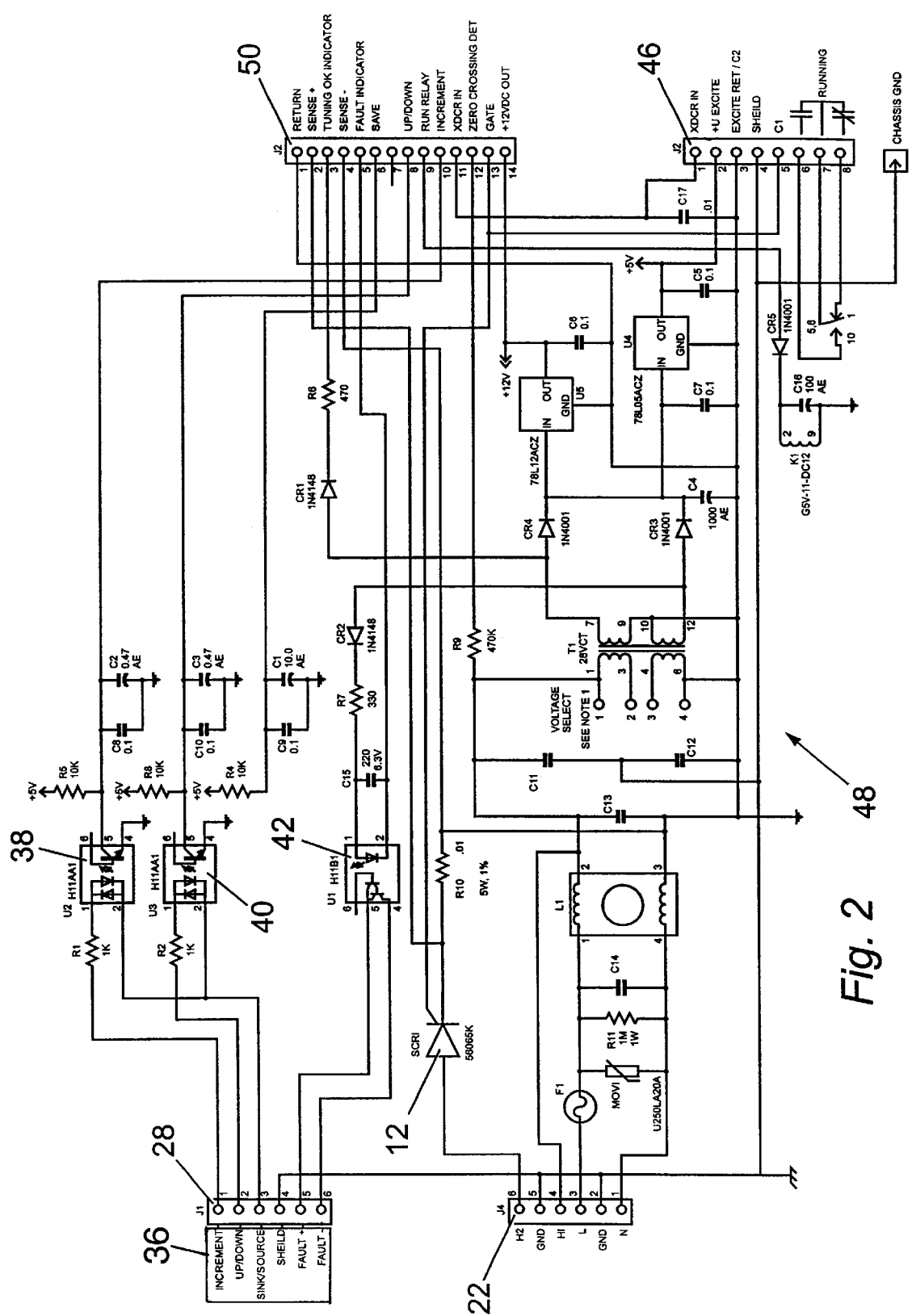
FIG. 2 is a schematic circuit diagram of a power board for use with the controller of FIG. 1.

The logic board includes an example of circuitry for implementing the various functions of the controller 10. FIG. 2 shows a schematic circuit diagram of a power board which forms part of the controller 10 of the present invention. The power board includes an example of circuitry for selecting between various input voltages (i.e., for selecting either 115 volts ac or 230 volts ac).

Referring now to FIG. 1, the logic board of the controller 10 includes a digitally controlled potentiometer 11 which also functions as an electrically erasable programmable read-only-memory (EEPROM). To control the vibrating system, the amplitude of a sine wave applied through silicon controlled rectifier (SCR) 12 (FIG. 2) to a vibrating block (see FIG. 4) may be varied. This change in amplitude in the sine wave results in an increase in the amplitude of vibrations at the vibratory block.

A first push button switch 16 (increment) allows the amplitude of the sine wave to be increased by transmitting a digital pulse to the potentiometer 11 each time the push button switch 16 is depressed. More specifically, when the first push button switch 16 is depressed, pin 1 of the digitally controlled potentiometer 11 goes low, causing the output of an operational amplifier 18 to increase. This increase in output voltage at the operational amplifier 18 changes the pulse to a transistor 20, the output of which is coupled to the gate of the SCR 12 such that the SCR 12 is triggered on earlier in a firing cycle. The earlier triggering of the SCR 12 causes an increase in the voltage across a vibratory block (not shown) which is connected to the terminals H1 and H2 on junction strip 22 (FIG. 2), thus causing the amplitude of the vibrations at the vibratory block to increase. Repeated depression of the first push button switch 16 causes the amplitude of vibration to be increased an incremental amount for each depression of the push button switch 16.

A second push button switch 24 (up/down) is used to control the function of the first push button switch 16. If the first push button switch 16 is depressed alone, then the vibrations at the vibratory block will incrementally increase for each depression of the push button switch 16 as described above. If the second push button switch 24 is pushed and held depressed, then the amplitude of the vibrations at the vibratory block will decrease an incremental amount for each depression of the first push button switch 16 while the second push button 24 is held depressed.

Thus, when the first push button switch 16 is repeatedly depressed while the second push button 24 is held depressed, the inputs to pins 1 and 3 of the digitally controlled potentiometer 11 go low. Consequently, the output voltage at the potentiometer 11 (pin 5) reduces, causing the firing point of the SCR 12 to be later in its firing cycle. This reduces the potential across the vibratory block and the amplitude of the vibrations.

A single depress of the first push button switch 16 changes the current to the gate of the SCR 12 by, for example, between 0.125 and 0.2 amps. This change in current results in an increase of amplitude of vibration of the vibratory blocks about twenty thousandths of an inch (0.58 mm). A similar reduction in current and amplitude of vibration results when the first push button switch 16 is depressed while the second push button switch 24 is held depressed.

To avoid having to reset the amplitude of the vibrations after power to the controller 10 is switched off, a third push button switch 26 is coupled to the digital potentiometer 11 so as to store the current parameter settings of the vibration amplitude level in the EEPROM memory of the digitally controlled potentiometer 11. Thus, when the controller 10 is switched off and then switched back on, the controller will automatically re-initialize to the vibration amplitude level previously set before the third push button 26 was depressed.

Optionally, a display screen such as a liquid crystal display (LCD) 60 may be used to monitor the amplitude level of vibration. Thus, when an increase or decrease in amplitude of vibration is desired, the first and second push button switches 16, 24 are depressed accordingly and the amplitude of the vibrations is displayed on the LCD 60. This allows the level of amplitude of vibration to be monitored and set more accurately. Conventional controllers use an analog scale to set the amplitude which is less accurate and relies on a user correctly interpreting the value from an analog display.

A conventional solid state accelerometer or transducer (not shown) is coupled to the vibrating block. The transducer produces an AC sine wave which is proportional to the vibrations at the vibratory block. The AC peak voltage is converted to a DC voltage by a converter circuit, generally designated 44 in FIG. 1. The DC voltage is used as a reference voltage for servo control, the DC voltage being applied to the operational amplifier 18 which is configured in comparator mode. Thus, the controller 10 will automatically keep the amplitude of vibration substantially constant.

Conventional vibratory systems use a photoelectric interrupter transducer (not shown) which typically comprise a light emitting diode (LED) and a phototransistor which face one another across a slot. A pin or the like is mounted to the vibratory block wherein movement of the block moves the pin in the slot, thus interrupting the beam between the LED and the phototransistor. As the vibrator oscillates, the phototransistor is alternatively light and dark which provides an amplitude dependent signal to the controller.

These mechanical transducers are not as reliable as solid state transducers because they have moving parts and are prone to failure. In addition, the amplitude dependent signal is not always accurate. Further, the amplitude of vibration using such mechanical transducers cannot be controlled from a remote location.

In order to increase the accuracy and lifetime of the transducer, a solid state transducer (not shown) is used. The transducer is coupled to a junction 46 on the power board (FIG. 2). Unlike the conventional filtered transducer signal which is often slow, or the use of sample and hold circuits with fixed duration and trigger times, solid state transducers are more tolerant of electrical noise and phase shift. Thus, more reliable control of the system can be achieved in harsh industrial environments.

In addition, the transducer allows the mechanical condition of the vibratory block to be monitored, even from a remote location using, for example, a smart controller such as a programmable logic controller 36 (PLC). One sign of impending failure of a vibratory block is a decrease in the mechanical resonant frequency. It has been found that a vibration block works at peak performance when its resonant frequency is tuned slightly above the frequency of the AC line voltage powering the block. For example, an optimal frequency of resonance is about 61.5 Hz to about 62.0 Hz for an AC line frequency of 60 Hz. As the vibration block begins to wear, the frequency of vibration begins to approach the line frequency and then becomes lower than the line frequency.

The controller 10 determines when the frequency of vibration falls below the AC line voltage by indicating a fault condition by means of fault circuitry enclosed by the line 34. The fault circuitry compares the AC line signal and the sinusoidal signal derived from the transducer or accelerometer coupled to the vibration block. The AC line signal is modified for phase comparison with the transducer signal by being sent through a zero crossing detector generally designated as 35. The modified AC line signal after passing through the zero crossing detector is in the shape of a square wave. The modified line signal is then delayed 90° at a delay stage generally designated as 37. The modified line signal is then translated into a signal having a slope at a ramp stage generally designated as 39. The slope which is a function of the number of digital pulses generated by the pushbutton switch 16 or a remote controller is what is compared to a DC level signal from the transducer. The lower in voltage the signal coming from the transducer, the earlier in the cycle the SCR 12 will be triggered based on a predetermined setting of the digital potentiometer 11. The phase angle of the signal from the transducer is compared with the phase angle of the AC line voltage. A transducer lagging phase angle resulting from the frequency of vibration dropping below the line frequency indicates that maintenance of the vibratory block may be required.

To monitor the status of the controller 10, two light emitting diodes (LEDs) 30, 32 are provided. LED 30 is typically a green LED and indicates that the vibratory block is running. LED 32 is typically red and indicates that there is a fault in the system resulting from the lowered frequency of vibration. A timer circuit generally designated 34 in FIG. 1 controls the operation of the LEDs 30, 32 causing them to pulse rather than light continuously to conserve power.

The controller 10 includes an interface for controlling the amplitude of vibration remotely by means of an additional intelligent controller, such as a programmable logic controller 36 (PLC), (not shown) which is coupled to a junction 28 on the power board (FIG. 2). The remote intelligent controller allows a user to increase or decrease the amplitude of the vibrations remotely. The status of the controller 10 may also be displayed on the remote intelligent controller by using similar LEDs to the LEDs 30, 32. Optionally, the amplitude of the vibrations may be displayed on an LCD on the remote controller. The circuitry of the remote intelligent controller is isolated from the circuitry of the controller 10 using opto-isolators 38, 40, 42 (FIG. 2). The opto-isolators 38, 40, 42 isolate the increment and up/down switches on the remote intelligent controller and also the status LEDs. Note that the remote intelligent controller may be used without digital to analog conversion, thus reducing the over-all cost and complexity of the controller. The digital pulses generated by the PLC 36 simulate a more complex and expensive analog control circuitry otherwise required to adjust the amplitude of vibration from a remote location.

Relay outputs on junction 50 (FIGS. 1 and 2) indicate that the vibratory block is vibrating and can be used to control other equipment, such as line feeders, vibrating lines or the like, or may be used to signal the remote intelligent controller.

Input to the controller 10 is typically single phase line neutral and earth ground. Output from the controller 10 is typically single phase half wave. The controller 10 includes a transformer circuit generally designated 48 in FIG. 2. The transformer circuit 48 allows the controller 10 to be operated from 115 or 230 volts AC. The input voltage is selected using jumpers. This provides a more versatile controller.

Figure 3:
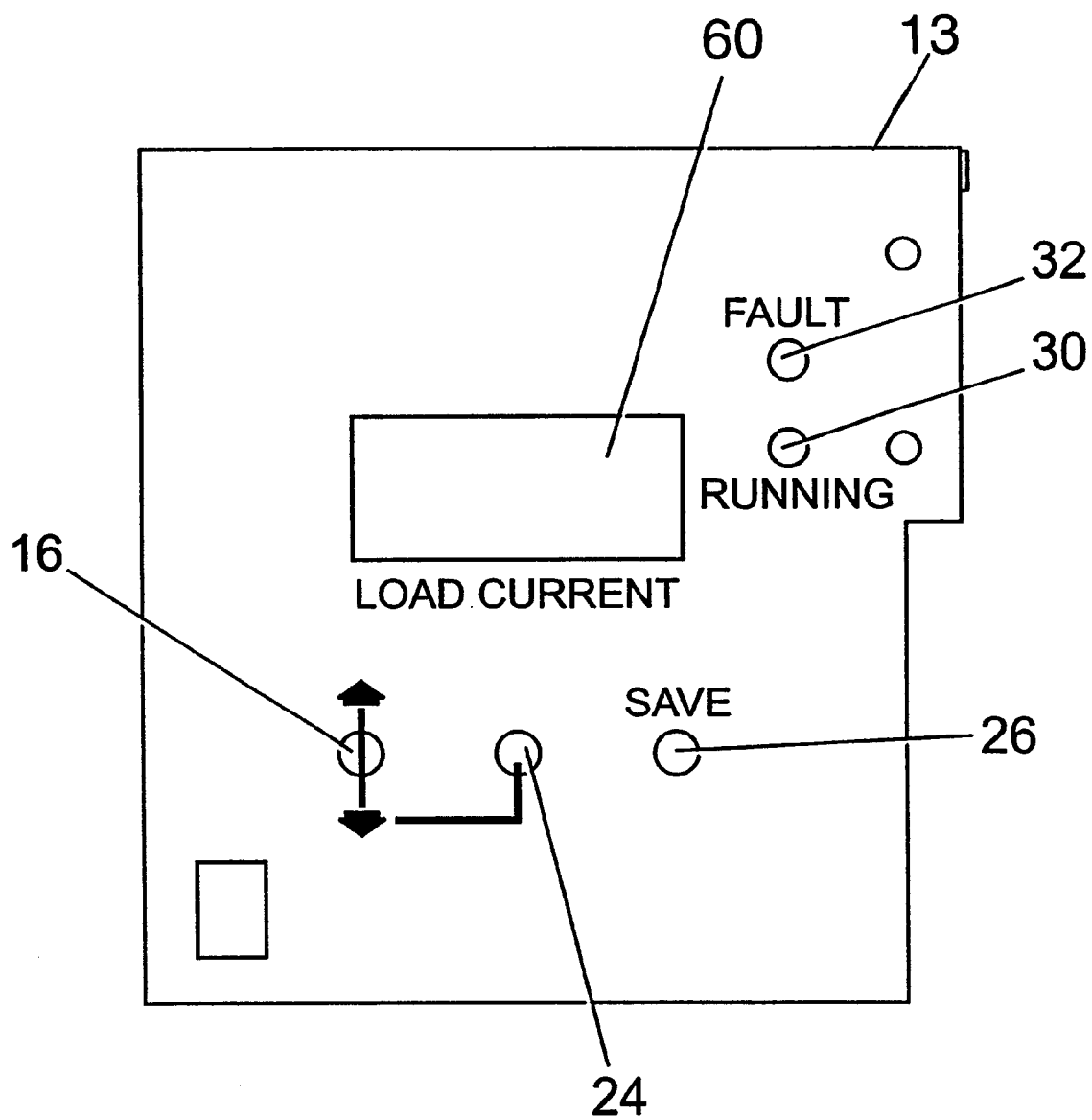
FIG. 3 is a front view of a housing for the controller of FIG. 1.

FIG. 3 shows a typical housing 13 for the controller 10 of the present invention. FIG. 3 is a front view of the housing 13, showing the LCD display 60, the status LEDs 30, 32 and also the push buttons 16, 24 and 26.

Figure 4:
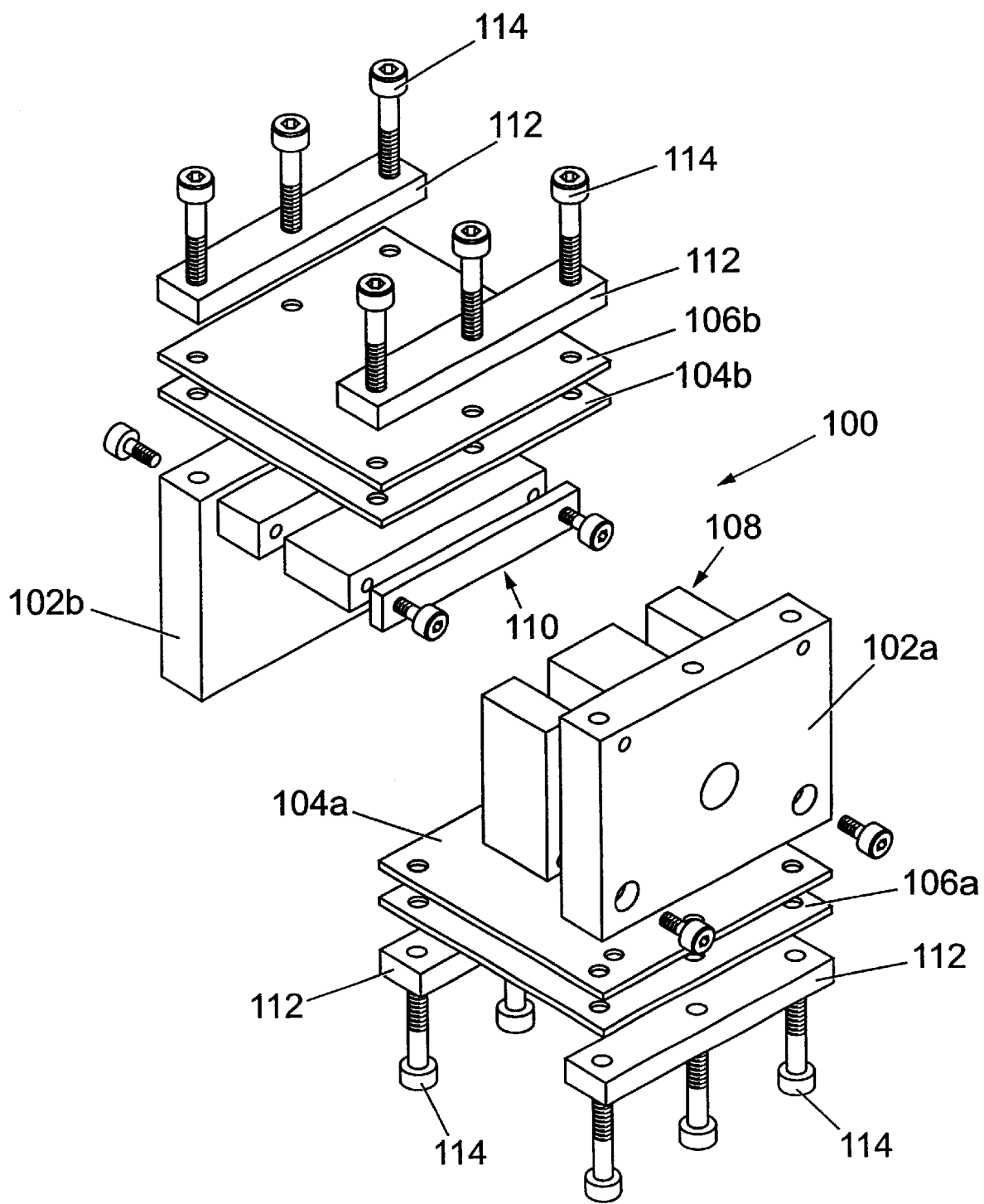
FIG. 4 is an exploded view of a vibratory block according to a second aspect of the present invention.

Referring now to FIG. 4, a vibratory block is generally designated by the reference number 100. The vibratory block 100 comprises a pair of heavy end plates 102a, 102b which are coupled together by at least one pair of composite leaf springs 104a, 104b. The springs are separated from the end plates 102a, 102b (and from each other if more than one pair is used) by a pair of spacers 106.

One of the end plates 102a has an encapsulated coil and iron core generally designated 108 coupled thereto, which forms part of an electromagnet. The opposite end plate 102b has an armature 110 coupled thereto. The air gap between the encapsulated coil and iron core 108 and the armature 110 is adjustable. The springs 104a, 104b and spacers 106 are mounted to the end plates 102a, 102b using clamp bars 112 and mounting screws 114.

One or more pairs of springs 104a, 104b are used, depending upon the weight of the vibratory equipment which the vibratory block 100 is to drive. The spacers 106 between the end plates 102a, 102b and the springs 104a, 104b are used to reduce friction and to prevent fretting corrosion at the clamped end.

The composite springs 104a, 104b are preferably manufactured from continuous glass filaments which are oriented in a particular manner. Approximately 85–90% of the filaments are oriented longitudinally in the bending or primary direction. However, 10–15% of the filaments are positioned just under the surface and are oriented to be approximately perpendicular to the longitudinal filaments. This increases the strength of the spring 104a, 104b in the "cross" direction.

Composite springs 104a, 104b provide a number of advantages. Firstly, the springs 104a, 104b give improved pressure distribution. Secondly, the springs 104a, 104b have a longer lifetime. Thirdly, composite springs 104a, 104b can move further; that is, conventional steel springs can flex approximately one quarter of an inch (approximately 6.25 mm), whereas the composite springs 104a, 104b can flex about 0.32 inches (about 8 mm). This amplitude difference is advantageous vibratory equipment, and gives a wider range of vibration. In addition, composite springs 104a, 104b can store more energy and thus reduce the mount of current required to drive the vibratory system, making the system more efficient.

Thus, there is provided a controller 10 for a vibration system which is versatile and offers many advantages over conventional systems. The controller 10 may be used to set the amplitude of vibration of at least one vibratory block, which may then be stored for subsequent retrieval. Other features include the possibility of remote control.

There is also provided an improved vibratory block for use with vibration systems. The vibratory block uses composite springs which provide many advantages over conventional steel springs.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention. For example, Accordingly, the present invention has been shown and described by way of illustration rather than limitation.

What is claimed is:

1. A vibratory system for a vibration feeder comprising:
   pulse means for generating electrical digital pulse signals;
   a controller for receiving a digital impulse signal and for generating a DC voltage level signal that is incrementally increased or decrementallly decreased in magnitude in response to each digital impulse signal; and
   at least one vibration block energized by the DC voltage level signal for being incrementally increased or decrementally decreased in an amplitude of vibration of the vibration block in response to the respective incrementally increasing or decrementally decreasing DC voltage level signal generated by the controller.

2. A vibratory system as defined in claim 1, wherein the controller is a digital potentiometer.

3. A vibratory system as defined in claim 1, further including an additional controller coupled to the controller to provide an additional source for generating electrical digital impulse signals.

4. A vibratory system as defined in claim 3, wherein the additional controller is located remotely of the controller.

5. A vibratory system as defined in claim 3, wherein the additional controller is a programmable logic controller (PLC).

6. A vibratory system as defined in claim 3, wherein the additional controller is coupled to the controller via at least one opto-isolater.

7. A vibratory system as defined in claim 1, wherein the pulse means is at least one, normally open, switch that generates an electrical digital impulse signal for each activation of the switch.

8. A vibratory system as defined in claim 7, wherein the at least one switch includes an up/down switch, and further including an increment switch, the up/down switch being activated to change the magnitude of the DC voltage level signal generated by the controller in one of an incrementally increasing and decrementally decreasing direction, and the activation of the up/down switch during each activation of the increment switch to change the magnitude of the DC voltage level signal in the other of an incrementally increasing and decrementally decreasing direction.

9. A vibratory system as defined in claim 8, wherein the increment switch and the up/down switch are pushbutton switches.

10. A vibratory system as defined in claim 1, further including fault detection means for determining whether a mechanical resonance frequency of the at least one vibration block has decreased below a predetermined minimum value.

11. A vibratory system as defined in claim 10, wherein the resonance frequency of the at least one vibration block is slightly above the AC line signal frequency powering the vibratory system, and the fault detection means includes a comparator for comparing the frequency of the at least one vibration block with the frequency of the AC line signal, and an indicator activated when the frequency of the vibration block decreases below that of the AC line signal.

12. A vibratory system as defined in claim 11, wherein the resonance frequency is approximately one to two cycles per second above that of the AC line signal.

13. A vibratory system as defined in claim 1, further including means for saving the DC voltage level generated by the controller.

* * * * *